United States Patent
Tao et al.

(10) Patent No.: US 8,871,874 B2
(45) Date of Patent: Oct. 28, 2014

(54) THERMOPLASTIC MELT-MIXED COMPOSITION WITH EPOXY-AMINO ACID COMPOUND HEAT STABILIZER AND PROCESSES FOR THEIR PREPARATION

(71) Applicant: E I Du Pont De Nemours and Company, Wilmington, DE (US)

(72) Inventors: Yuefei Tao, Hockessin, DE (US); Lech Wilczek, Wilmington, DE (US); Jennifer Leigh Thompson, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/915,952

(22) Filed: Jun. 12, 2013

(65) Prior Publication Data
US 2013/0338262 A1  Dec. 19, 2013

Related U.S. Application Data

(60) Provisional application No. 61/658,995, filed on Jun. 13, 2012.

(51) Int. Cl.
  C08L 77/06  (2006.01)
  C08L 79/02  (2006.01)
  C08G 73/02  (2006.01)

(52) U.S. Cl.
  CPC ............... *C08L 77/06* (2013.01); *C08G 73/028* (2013.01)
  USPC ........... 525/430; 525/432; 525/438; 523/400; 524/236; 524/238; 524/239; 524/243; 524/244; 524/245; 524/247; 524/249; 524/250; 528/366; 528/421

(58) Field of Classification Search
  CPC ........ C08G 59/44; C08G 59/52; C08G 59/58; C08G 59/182; C08G 59/184; C08G 59/186; C08G 59/448; C08G 59/4284; C08G 73/028; C08G 69/08
  USPC .......... 525/430, 432, 438; 524/236, 238, 239, 524/243, 244, 245, 247, 249, 250; 528/114, 528/310, 366, 421
  See application file for complete search history.

(56) References Cited

U.S. PATENT DOCUMENTS

| | | | |
|---|---|---|---|
| 2,462,047 A | 2/1949 | Wyler | |
| 2,994,673 A | 8/1961 | Capron | |
| 4,119,609 A * | 10/1978 | Allen et al. | 525/510 |
| 4,137,212 A | 1/1979 | Theysohn et al. | |
| 4,315,086 A | 2/1982 | Ueno | |
| 4,356,277 A * | 10/1982 | Birkmeyer | 523/406 |
| 4,552,912 A | 11/1985 | Williams | |
| 4,567,235 A | 1/1986 | Sasaki et al. | |
| 5,177,144 A | 1/1993 | Torre et al. | |
| 5,296,556 A | 3/1994 | Frihart | |
| 5,605,945 A | 2/1997 | Sayed | |
| 5,612,448 A | 3/1997 | Frihart | |
| 6,025,463 A | 2/2000 | Pfaendner et al. | |
| 6,028,129 A | 2/2000 | Pfaendner et al. | |
| 6,136,944 A | 10/2000 | Stewart | |
| 6,274,697 B1 | 8/2001 | Zahr | |
| 6,723,443 B2 * | 4/2004 | Tsai et al. | 428/475.5 |
| 7,405,249 B2 | 7/2008 | Kim | |
| 2001/0056145 A1 | 12/2001 | Martens et al. | |
| 2005/0228109 A1 | 10/2005 | Chandra et al. | |
| 2008/0262133 A1 | 10/2008 | Eibeck et al. | |
| 2008/0262311 A1 | 10/2008 | Itou et al. | |
| 2008/0269375 A1 | 10/2008 | Park et al. | |
| 2009/0260761 A1 | 10/2009 | Krawinkel | |
| 2010/0028581 A1 | 2/2010 | Palmer et al. | |
| 2010/0029819 A1 | 2/2010 | Palmer et al. | |
| 2010/0090174 A1 | 4/2010 | Weber et al. | |
| 2012/0010343 A1 | 1/2012 | Prusty et al. | |
| 2012/0196961 A1 | 8/2012 | Kobayashi et al. | |
| 2012/0196962 A1 | 8/2012 | Kobayashi et al. | |
| 2012/0321829 A1 | 12/2012 | Bayer et al. | |

FOREIGN PATENT DOCUMENTS

| | | |
|---|---|---|
| EP | 0196194 | 1/1989 |
| EP | 0190001 | 6/1989 |
| EP | 1041109 | 4/2000 |
| GB | 872381 | 7/1961 |
| JP | 197595359 | 7/1975 |
| JP | 201126446 | 10/2011 |
| WO | 2011157615 | 12/2011 |

OTHER PUBLICATIONS

Japanese Abstract JP-60181159A, Rifid, Impact-Resistant Polyamide . . . Olefins. Inventor: Mori K, Assignee Dainippon Ink & Chem KK.
Korean Abstract KR20020010356A, Polyamide Resin Composition, Inventor: Choi Jin Myeong.
Principles of Polymerization, Second Edition, George Odian, John Wiley & Sons, pp. 116-119.

\* cited by examiner

*Primary Examiner* — Mark Kaucher
*Assistant Examiner* — Kregg Brooks

(57) ABSTRACT

Disclosed is a thermoplastic melt-mixed composition including: a) a polyamide resin; b) a poly(amino acid)-polyol compound provided by reacting: b1) one or more amino acids selected from the group consisting of primary amino acids and secondary amino acids and combinations of these; the amino acid having no more than one hydroxyl group; and b2) one or more polyepoxy compound comprising at least two or more epoxy groups; the poly(amino acid)-polyol compound having a range of at least 10 percent conversion of epoxy equivalents of component (b1) up to, but excluding, the gel point of the components b1) and b2) and c) reinforcing agent; and, optionally, d) polymeric toughener; and f) further additives. Processes for making the composition are also disclosed.

9 Claims, No Drawings

THERMOPLASTIC MELT-MIXED COMPOSITION WITH EPOXY-AMINO ACID COMPOUND HEAT STABILIZER AND PROCESSES FOR THEIR PREPARATION

CROSS REFERENCE TO RELATED APPLICATIONS

This application claims priority to U.S. Provisional Application No. 61/658,995, filed Jun. 13, 2012.

FIELD OF INVENTION

The present invention relates to the field of polyamide compositions having improved long-term high temperature aging characteristics.

BACKGROUND OF INVENTION

High temperature resins based on polyamides possess desirable chemical resistance, processability and heat resistance. This makes them particularly well suited for demanding high performance automotive and electrical/electronics applications. There is a current and general desire in the automotive field to have high temperature resistant structures since temperatures higher than 150° C., even higher than 200° C., are often reached in under-hood areas of automobiles. When plastic parts are exposed to such high temperatures for a prolonged period, such as in automotive under-the-hood applications or in electrical/electronics applications, the mechanical properties generally tend to decrease due to the thermo-oxidation of the polymer. This phenomenon is called heat aging.

In an attempt to improve heat aging characteristics, polyhydric alcohols have been found to give significantly improved heat aging characteristics as disclosed in US patent application publication US 2010-0029819 A1 (Palmer et al). However, molded articles derived from the polyamide compositions comprising the polyhydric alcohols have a tendency to undergo surface whitening upon aging at high humidity; which is an undesirable feature for many applications.

There remains a need for thermoplastic compositions that are suitable for manufacturing articles that exhibit good mechanical properties after long-term high temperature exposure and have desirable visual properties; that is, exhibit no whitening or a low degree of whitening, upon aging at high humidity.

EP 1041109 discloses a polyamide composition comprising a polyamide resin, a polyhydric alcohol having a melting point of 150 to 280° C., that has good fluidity and mechanical strength and is useful in injection welding techniques.

Pending U.S. patent application U.S. Ser. No. 13/359,885, filed Jan. 27, 2012, discloses a thermoplastic molding composition including an amino acid heat stabilizer having two or more carboxylic acids.

Pending U.S. patent application U.S. Ser. No. 13/359,784, filed Jan. 27, 2012, discloses a thermoplastic molding composition including a hydroxylamino acid heat stabilizer having one or more hydroxyl groups.

KR 20020010356 A discloses a polyamide composition comprising a polyamide resin, a plasticizer selected from the group consisting of plasticizers including lactam-based plasticizer and an epoxy resin.

U.S. Pat. No. 5,605,945 discloses a polyamide molding composition with increased viscosity, high thermal stability and favorable mechanical properties comprising a polyamide resin and a diepoxide.

U.S. Pat. No. 4,315,086 discloses a resin composition comprising a poly(phenyl oxide)/polyamide, and a member select from the group consisting of A) liquid diene polymers, B) epoxy compounds and C) compounds having in the molecule both an ethylene carbon-carbon double bond or a carbon-carbon triple bond and a group including an carboxylic acid group.

US patent publication 2005/0228109 discloses a thermoplastic composition comprising poly(phenylene oxide), polyamide, an unsaturated carboxylic acid copolymer and/or a polymer with pendant epoxy groups.

SUMMARY

One embodiment of the invention is a thermoplastic melt-mixed composition comprising:
  a) 15 to 89.5 weight percent of a poly(hexamethylene hexanediamide);
  b) 0.5 to 10 weight percent of a poly(amino acid)-polyol compound provided by reacting:
    b1) 90 to 10 weight percent one or more amino acids selected from the group consisting of primary amino acids and secondary amino acids and combinations of these; said amino acid having no more than one hydroxyl group; and
    b2) 10 to 90 weight percent of one or more polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM D1652-11 method; and a number average molecular weight ($M_n$) of less than 8000;
  wherein the weight percent of component b) is based on the total weight of b1) and b2); said poly(amino acid)-polyol compound having a range of at least 10 percent conversion of epoxy equivalents of component (b1) up to, but excluding, the gel point of the components b1) and b2) as determined with $^1$H NMR analysis of the poly(amino acid)-polyol;
  c) 10 to 60 weight percent of reinforcing agent;
  d) 0 to 30 weight percent polymeric toughener; and
  e) 0 to 10 weight percent further additives;
wherein the weight percentages a), b), c), d), and e) are based on the total weight of the thermoplastic melt-mixed composition.

Another embodiment is a process for providing a thermoplastic melt-mixed composition comprising:
  A) melt-blending:
    a) 15 to 89.5 weight percent of poly(hexamethylene hexanediamide);
    b) 0.5 to 10 weight percent of a poly(amino acid)-polyol compound provided by reacting:
      b1) 90 to 10 weight percent one or more amino acids selected from the group consisting of primary amino acids and secondary amino acids and combinations of these; said amino acid having no more than one hydroxyl group; and
      b2) 10 to 90 weight percent of a polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM D1652-11 method; and a number average molecular weight ($M_n$) of less than 8000;

c) 10 to 60 weight percent of reinforcing agent;
d) 0 to 30 weight percent polymeric toughener; and
e) 0 to 10 weight percent further additives;
to provide said thermoplastic melt-mixed composition; wherein the weight percent of b) is based on the total weight of b1) and b2); said poly(amino acid)-polyol compound having a range of at least 10 percent conversion of epoxy equivalents of component b1) up to, but excluding, the gel point of the components b1) and b2) as determined with $^1$H NMR analysis of the poly(amino acid)-polyol compound.

Another embodiment is a method for improving tensile strength retention of a thermoplastic melt-mixed composition under air oven ageing (AOA) conditions comprising:
melt-blending:
a) 15 to 89.5 weight percent of poly(hexamethylene hexanediamide);
b) 0.5 to 10 weight percent of a poly(amino acid)-polyol compound provided by reacting:
b1) 90 to 10 weight percent one or more amino acids selected from the group consisting of primary amino acids and secondary amino acids and combinations of these; said amino acid having no more than one hydroxyl group; and
b2) 10 to 90 weight percent of a polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM 01652-11 method; and a number average molecular weight ($M_n$) of less than 8000;
c) 10 to 60 weight percent of reinforcing agent;
d) 0 to 30 weight percent polymeric toughener; and
e) 0 to 10 weight percent further additives;
to provide said thermoplastic melt-mixed composition; wherein the weight percent of b) is based on the total weight of b1) and b2); said poly(amino acid)-polyol compound having a range of at least 10 percent conversion of epoxy equivalents of component (a) up to, but excluding, the gel point of the components a) and b) as determined with $^1$H NMR analysis of the poly(amino acid)-polyol compound; wherein 2 mm thick test bars, prepared from said melt-mixed composition and tested according to ISO 527-2/1BA, and exposed at a test temperature of 230° C. for a test period of 1000 hours, in an atmosphere of air, have on average, a retention of tensile strength of at least 25 percent, as compared with that of an unexposed control of identical composition and shape; and wherein the polyamide resin is poly(hexamethylene hexanediamide).

DETAILED DESCRIPTION

Herein melting points and glass transitions are as determined with differential scanning calorimetry (DSC) at a scan rate of 10° C./min in the first heating scan, wherein the melting point is taken at the maximum of the endothermic peak and the glass transition, if evident, is considered the mid-point of the change in enthalpy.

For the purposes of the description, unless otherwise specified, "high-temperature" means a temperature at or higher than 210° C., and most preferably at or higher than 230° C.

In the present invention, unless otherwise specified, "long-term" refers to an aging period equal or longer than 500 hrs.

As used herein, the term "high heat stability", as applied to the polyamide composition disclosed herein or to an article made from the composition, refers to the retention of physical properties (for instance, tensile strength) of 2 mm thick molded test bars consisting of the polyamide composition that are exposed to air oven aging (AOA) conditions at a test temperature at 230° C. for a test period of at least 500 h, in an atmosphere of air, and then tested according to ISO 527-2/1 BA method. The physical properties of the test bars are compared to that of unexposed controls that have identical composition and shape, and are expressed in terms of "% retention". In a preferred embodiment the test temperature is at 230° C., the test period is at 1000 hours and the exposed test bars have a % retention of tensile strength of at least 40%. Herein "high heat stability" means that said molded test bars, on average, meet or exceed a retention for tensile strength of 40% when exposed at a test temperature at 230° C. for a test period of at least 1000 h. Compositions exhibiting a higher retention of physical properties for a given exposure temperature and time period have better heat stability.

The terms "at 170° C.," "at 210° C." and "at 230° C." refer to the nominal temperature of the environment to which the test bars are exposed; with the understanding that the actual temperature may vary by +/−2° C. from the nominal test temperature.

One embodiment of the invention is a thermoplastic melt-mixed composition comprising:
a) 15 to 89.5 weight percent of a polyamide resin;
b) 0.5 to 10 weight percent of a poly(amino acid)-polyol compound provided by reacting:
b1) 90 to 10 weight percent one or more amino acids selected from the group consisting of primary amino acids and secondary amino acids and combinations of these; said amino acid having no more than one hydroxyl group; and
b2) 10 to 90 weight percent of one or more polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM 01652-11 method; and a number average molecular weight (Mn) of less than 8000, as determined with size exclusion chromatography;
wherein the weight percent of component b) is based on the total weight of b1) and b2); said poly(amino acid)-polyol compound having a range of at least 10 percent conversion of epoxy equivalents of component (b1) up to, but excluding, the gel point of the components b1) and b2) as determined with $^1$H NMR analysis of the poly(amino acid)-polyol;
c) 10 to 60 weight percent of reinforcing agent;
d) 0 to 30 weight percent polymeric toughener; and
e) 0 to 10 weight percent further additives;
wherein the weight percentages a), b), c), d), and e) are based on the total weight of the thermoplastic melt-mixed composition.

Polyamide Resin

The thermoplastic polyamide compositions of various embodiments of the invention comprise a polyamide resin. The polyamide resins are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic.

Fully aliphatic polyamides are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, is but are not limited to aliphatic carboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), pentadecanedioic acid (C15), hexadecanedioic acid (C16) and octadecanedioic acid (C18). Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

The semi-aromatic polyamide is a homopolymer, a copolymer, a terpolymer or more advanced polymers formed from monomers containing aromatic groups. One or more aromatic carboxylic acids may be terephthalate or a mixture of terephthalate with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

HMD hexamethylene diamine (or 6 when used in combination with a diacid)
T Terephthalic acid
AA Adipic acid
DMD Decamethylenediamine
€ -Caprolactam
DDA Decanedioic acid
DDDA Dodecanedioic acid
TDDA Tetradecanedioic acid
HDDA Hexadecanedioic acid
ODDA Octadecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and AA
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
610 polymer repeat unit formed from HMD and DDA
612 polymer repeat unit formed from HMD and DDDA
614 polymer repeat unit formed from HMD and TDDA
616 polymer repeat unit formed from HMD and HDDA
618 polymer repeat unit formed from HMD and ODDA
6 polymer repeat unit formed from € -caprolactam
11 polymer repeat unit formed from 11-aminoundecanoic acid
12 polymer repeat unit formed from 12-aminododecanoic acid Note that in the art the term "6" when used alone designates a polymer repeat unit formed from € -caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

In one embodiment the polyamide composition comprises a one or more polyamides selected from the group consisting of Group (I) polyamides having a melting point of less than 210° C., and comprising an aliphatic or semiaromatic polyamide selected from the group is consisting of poly (pentamethylene decanediamide) (PA510), poly(pentamethylene dodecanediamide) (PA512), poly(ε-caprolactam/hexamethylene hexanediamide) (PA6/66), poly (ε-caprolactam/hexamethylene decanediamide) (PA6/610), poly(ε-caprolactam/hexamethylene dodecanediamide) (PA6/612), poly(hexamethylene tridecanediamide) (PA613), poly(hexamethylene pentadecanediamide) (PA615), poly(ε-caprolactam/tetramethylene terephthalamide) (PA6/4T), poly(ε-caprolactam/hexamethylene terephthalamide) (PA6/6T), poly(ε-caprolactam/decamethylene terephthalamide) (PA6/10T), poly(ε-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly (hexamethylene tetradecanediamide/hexamethylene terephthalamide) (PA614/6T), poly(ε-caprolactam/hexamethylene isophthalamide/hexamethylene terephthalamide) (PA6/6I/6T), poly(ε-caprolactam/hexamethylene hexanediamide/hexamethylene decanediamide) (PA6/66/610), poly(ε-caprolactam/hexamethylene hexanediamide/hexamethylene dodecanediamide) (PA6/66/612), poly(ε-caprolactam/hexamethylene hexanediamide/hexamethylene decanediamide/hexamethylene dodecanediamide) (PA6/66/610/612), poly(2-methylpentamethylene hexanediamide/hexamethylene hexanediamide/hexamethylene terephthamide) (PA D6166/6T), poly(2-methylpentamethylene hexanediamide/hexamethylene hexanediamide/) (PA D6/66), poly(decamethylene decanediamide) (PA1010), poly(decamethylene dodecanediamide) (PA1012), poly(decamethylene decanediamide/decamethylene terephthalamide) (PA1010/10T) poly(decamethylene decanediamide/dodecamethylene decanediamide/decamethylene terephthalamide/dodecamethylene terephthalamide (PA1010/1210/10T/12T), poly(11-aminoundecanamide) (PA11), poly(11-aminoundecanamide/tetramethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanamide/dodecamethylene terephthalamide) (PA11/

12T), poly(12-aminododecanamide) (PA12), poly(12-aminododecanamide/tetramethylene terephthalamide) (PA12/4T), poly(12-aminododecanamide/hexamethylene terephthalamide) (PA12/6T), poly(12-aminododecanamide/decamethylene terephthalamide) (PA12/10T) poly(dodecamethylene dodecanediamide) (PA1212), poly(dodecamethylene dodecanediamide/dodecamethylene dodecanediamide/dodecamethylene terephthalamide)) (PA1212/12T), poly(hexamethylene hexadecanediamide) (PA616), and poly(hexamethylene octadecanediamide) (PA618); Group (II) polyamides having a melting point of at least 210° C., and comprising an aliphatic polyamide selected from the group consisting of poly(tetramethylene hexanediamide) (PA46), poly(ε-caprolactam) (PA 6), poly(hexamethylene hexanediamide/(ε-caprolactam/) (PA 66/6) poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), and poly(tetramethylene hexanediamide/2-methylpentamethylene hexanediamide) (PA46/D6); wherein within Group (II) Polyamides are Group (IIA) Polyamides having a melting point of at least 210° C. and less than 230° C. and Group (IIB) Polyamides having a melting point of 230° C. or greater;

Group (III) polyamides having a melting point of at least 230° C., and comprising
  (aa) about 20 to about 35 mole percent semiaromatic repeat units derived from monomers selected from one or more of the group consisting of:
    (i) aromatic dicarboxylic acids having 8 to 20 carbon atoms and aliphatic diamines having 4 to 20 carbon atoms; and
  (bb) about 65 to about 80 mole percent aliphatic repeat units derived from monomers selected from one or more of the group consisting of:
    (ii) an aliphatic dicarboxylic acid having 6 to 20 carbon atoms and said aliphatic diamine having 4 to 20 carbon atoms; and
    (iii) a lactam and/or aminocarboxylic acid having 4 to 20 carbon atoms;
Group (IV) polyamides comprising
  (cc) about 50 to about 95 mole percent semiaromatic repeat units derived from monomers selected from one or more of the group consisting of:
    (i) aromatic dicarboxylic acids having 8 to 20 carbon atoms and aliphatic diamines having 4 to 20 carbon atoms; and
  (dd) about 5 to about 50 mole percent aliphatic repeat units derived from monomers selected from one or more of the group consisting of:
    (ii) an aliphatic dicarboxylic acid having 6 to 20 carbon atoms and said aliphatic diamine having 4 to 20 carbon atoms; and
    (iii) a lactam and/or aminocarboxylic acid having 4 to 20 carbon atoms;
Group (V) polyamides having a melting point of at least 260° C., comprising
  (ee) greater than 95 mole percent semiaromatic repeat units derived from monomers selected from one or more of the group consisting of:
    (i) aromatic dicarboxylic acids having 8 to 20 carbon atoms and aliphatic diamines having 4 to 20 carbon atoms; and
  (ff) less than 5 mole percent aliphatic repeat units derived from monomers selected from one or more of the group consisting of:
    (ii) an aliphatic dicarboxylic acid having 6 to 20 carbon atoms and said aliphatic diamine having 4 to 20 carbon atoms;
    (iii) a lactam and/or aminocarboxylic acid having 4 to 20 carbon atoms; and
Group (VI) Polyamides having no melting point and selected from the group consisting of poly(hexamethylene isophthalamide/l hexamethylene terephthalamide) (6I/6T) and poly(hexamethylene isophthalamide/hexamethylene terephthalamide/hexamethylene hexanediamide) (6I/6T/66).

Group (I) polyamides may have semiaromatic repeat units to the extent that the melting point is less than 210° C. and generally the semiaromatic polyamides of the group have less than 40 mole percent semiaromatic repeat units. Semiaromatic repeat units are defined as those derived from monomers selected from one or more of the group consisting of: aromatic dicarboxylic acids having 8 to 20 carbon atoms and aliphatic diamines having 4 to 20 carbon atoms.

Another embodiment is a molded or extruded thermoplastic article wherein said polyamide resin is selected from Group (III) polyamides selected from the group consisting of poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) PA46/D6/10T), poly(hexamethylene hexanediamide/hexamethylene terephthalamide) (PA66/6T), poly(hexamethylene hexanediamide/hexamethylene isophthalamide/hexamethylene terephthalamide PA66/6I/6T, and poly(hexamethylene hexanediamide/2-methylpentamethylene hexanediamide/hexamethylene terephthalamide (PA66/D6/6T); and a most preferred Group (III) polyamide is PA 66/6T.

Another embodiment is a molded or extruded thermoplastic article wherein said polyamide resin is selected from Group (IV) polyamides selected from the group consisting of poly(tetramethylene terephthalamide/hexamethylene hexanediamide) (PA4T/66), poly(tetramethylene terephthalamide/ε-caprolactam) (PA4T/6), poly(tetramethylene terephthalamide/hexamethylene dodecanediamide) (PA4T/612), poly(tetramethylene terephthalamide/2-methylpentamethylene hexanediamide/hexamethylene hexanediamide) (PA4T/D6/66), poly(hexamethylene terephthalamide/2-methylpentamethylene terephthalamide/hexamethylene hexanediamide) (PA6T/DT/66), poly(hexamethylene terephthalamide/hexamethylene hexanediamide) PA6T/66, poly(hexamethylene terephthalamide/hexamethylene decanediamide) (PA6T/610), poly(hexamethylene terephthalamide/hexamethylene tetradecanediamide) (PA6T/614), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly (decamethylene terephthalamide/12-aminododecanamide) (PA10T/12) poly(decamethylene terephthalamide/decamethylene decanediamide) (PA10T/1010), poly(decamethylene terephthalamide/decamethylene dodecanediamide)

(PA10T/1012), poly(decamethylene terephthalamide/tetramethylene hexanediamide) (PA10T/46), poly(decamethylene terephthalamide/ε-caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/k-caprolactam) (PA12T/6), and poly(dodecamethylene terephthalamide/hexamethylene hexanediamide) (PA12T/66); and a most preferred Group (IV) polyamide is PA6T/66.

Another embodiment is a molded or extruded thermoplastic article wherein said polyamide resin is selected from Group (V) polyamides selected from the group consisting of poly(tetramethylene terephthalamide/2-methylpentamethylene terephthalamide) PA4T/DT, poly(tetramethylene terephthalamide/hexamethylene terephthalamide) PA4T/6T, poly(tetramethylene terephthalamide/decamethylene terephthalamide) PA4T/10T, poly(tetramethylene terephthalamide/dodecamethylene terephthalamide) PA4T/12T, poly(tetramethylene terephthalamide/2-methylpentamethylene terephthalamide/hexamethylene terephthalamide) (PA4T/DT/6T), poly(tetramethylene terephthalamide/hexamethylene terephthalamide/2-methylpentamethylene terephthalamide) (PA4T/6T/DT), poly(hexamethylene terephthalamide/2-methylpentamethylene terephthalamide) (PA6T/DT), poly(hexamethylene hexanediamide/hexamethylene isophthalamide) (PA 6T/6I), poly(hexamethylene terephthalamide/decamethylene terephthalamide) PA6T/10T, poly(hexamethylene terephthalamide/dodecamethylene terephthalamide) (PA6T/12T), poly(hexamethylene terephthalamide/2-methylpentamethylene terephthalamide/poly(decamethylene terephthalamide) (PA6T/DT/10T), poly(hexamethylene terephthalamide/decamethylene terephthalamide/dodecamethylene terephthalamide) (PA6T/10T/12T), poly(decamethylene terephthalamide) (PA100T), poly(decamethylene terephthalamide/tetramethylene terephthalamide) (PA100T/4T), poly(decamethylene terephthalamide/2-methylpentamethylene terephthalamide) (PA10T/DT), poly(decamethylene terephthalamide/dodecamethylene terephthalamide) (PA10T/12T), poly(decamethylene terephthalamide/2-methylpentamethylene terephthalamide/(decamethylene terephthalamide) (PA10T/DT/12T). poly(dodecamethylene terephthalamide) (PA12T), poly(dodecamethylene terephthalamide)/tetramethylene terephthalamide) (PA12T/4T), poly(dodecamethylene terephthalamide)/hexamethylene terephthalamide) PA12T/6T, poly(dodecamethylene terephthalamide)/decamethylene terephthalamide) (PA12T/10T), and poly(dodecamethylene terephthalamide)/2-methylpentamethylene terephthalamide) (PA12T/DT); and a most preferred Group (V) Polyamide is PA6T/DT.

In various embodiments the polyamide is a Group (I) Polyamide, Group (II) Polyamide, Group (III) Polyamide, Group (IV) Polyamide, or Group (V) Polyamide, respectively.

The polyamides may also be blends of two or more polyamides. Preferred blends include those selected from the group consisting of Group (I) and Group (II) Polyamides; Group (I) and Group (III) Polyamide, Group (II) and Group (III) Polyamides, Group (II) and Group (IV) Polyamides, Group (II) and Group (V) Polyamides, and Group (IV) and Group (V) Polyamides.

A preferred blend includes Group (II) and (V) Polyamides, and a specific preferred blend includes poly(hexamethylene hexanediamide) (PA 66) and poly(hexamethylene terephthalamide/2-methylpentamethylene terephthalamide) (PA 6T/DT).

Another preferred blend includes Group (II) and Group (III) Polyamides and a specific preferred blend includes poly(s-caprolactam) (PA6) and poly(hexamethylene hexanediamide/hexamethylene terephthalamide (PA66/6T).

In various embodiments 29 to 89.5, 49 to 89.5, or 55 to 89.5 weight percent of polyamide resin is present in the thermoplastic polyamide composition. Preferably the polyamide resin is a semicrystalline polyamide having a melting point and is preferably selected from Group (I) to Group (V) polyamides as disclosed above. In one embodiment there is less than 5 weight percent polyphenylene oxide present in the thermoplastic composition, and in another, no polyphenylene oxide is present. Preferably the polyamide resin has a number average molecular weight of at least 5000, and preferably at least 10000 as determined with size exclusion chromatography in hexafluoroisopropanol.

Poly(amino acid)-polyol Compound

Component b) is a poly(amino acid)-polyol compound provided by reacting b1) one or more amino acids and b2) a polyepoxy compound.

Component b1) is 90 to 10 weight percent one or more amino acids selected from the group consisting of primary amino acids and secondary amino acids and combinations of these; said amino acid having no more than one hydroxyl group. Preferably the amino acid has a number average molecular weight of less than or equal to about 1000, preferably less than 500 or 300, as determined by calculation of molecular weight of the amino acid; or, if the amino acid is an oligomeric material, as determined with size exclusion chromatography. Amino acids useful in the invention include aliphatic amino acids and aromatic amino acids. In one embodiment the amino acid is a primary amino acid. In another embodiment the amino acid has no more than one carboxylic acid. Herein amino acids may include one hydroxyl group and multiple acids The term "amino acid" includes salts and hydrates of amino acids including hydrochlorides, acetates, phosphates, monohydrates, and sodium and potassium salts.

Aliphatic amino acids include those selected from the group consisting of: N-methylglycine, DL-alanine, aminocyclohexanepropionic acid, 2-aminoisobutyric acid, 2-aminobutyric acid, DL-valine, DL-tert-leucine, DL-norvaline, DL-isoleucine, DL-leucine, DL-norleucine, DL-2-aminoprylic acid, beta-alanine, DL-3-aminoisobutyric acid, DL-3-aminobutyric acid, 4-aminobutyric acid, 5-aminovaleric acid, 6-aminocaproic acid, 7-aminoheptanoic acids, 8-aminocaprylic acid, 11-aminoundecanoic acid, 12-aminododecanoic acid, DL-serine, DL-isocerine, DL-homocerine, DL-threonine, DL-4-amino-3-hydroxybutyric acid, 1-amino-1-cyclopropanecarboxylic acid, 1-amino-1-cyclopentanecarboxylic acid, 1-amino-1-cyclohexanecarboxylic acid, trans-4-(aminomethyl)-cyclohexanecarboxylic acid, 2-amino-2-norbornanecarboxylic acid, DL-proline, DL-dipecanolic acid, nipecotic acid, DL-lysine, DL-aspartic acid, DL-glutamic acid monohydrate, DL-2-aminoadipic acid, 3-aminoadipic acid, 2,6-diaminopimelic acid, L-gamma-carboxyglutamic acid.

Aromatic amino acids include those selected from the group consisting of: 4-aminobenzoic acid, 3-aminobenzoic acid, 2-aminobenzoic acid, 2-phenylglycine, 2,2-diphenylglycine, N-phenylglycine, N-(4-hydroxyphenyl)glycine, DL-phenylalanine, alpha-methyl-DL-phenylalanine, DL-homophenylalanine, DL-2-fluorophenylglycine, DL-2-fluorphenylalanine, D-4-hydroxyphenylglycine, DL-tyrocine, 4-amino-DL-phenylalanine hydrate, DL-alpha-methyltyrosine, o-benzyl-L-tyrosine, and N-tritylglycine, In one embodiment the amino acid is selected from the group consisting of 6-aminohexanoic acid, lysine, 11-aminoundecanoic acid, 4-aminobenzoic acid; and salts of these compounds.

Component b2) is 10 to 90 weight percent of a polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM D1652-11 method; and a number average molecular weight ($M_n$) of less than 8000. In various embodiments the $M_n$ is less than 2000, less than 1000, and less than 400. Preferably the polyepoxy compound has a $M_n$ of less than 1000.

Examples of the polyepoxy compounds useful in the invention include 1,4-butanediol diglycidyl ether (BDE), bisphenol A diglycidyl ether (BADGE), bisphenol F diglycidyl ether (BFDE), trimethylolpropane triglycidyl ether (TTE), hydrogenated bisphenol A type epoxy resin, brominated epoxy resin, cycloaliphatic epoxy resin, and glycidyl amine type epoxy resin. Further examples of polyepoxides which can be used in the present invention include polyepoxides made by epoxidation of polyenes such as 1,3-butadiene diepoxide (MW 86.09, epoxy equivalent weight=43.05), 1,2,7,8-diepoxyoctane, 1,2,5,6-diepoxycyclooctane, 4-vinyl-1-cyclohexene diepoxide, and epoxidized polyisoprene copolymers such as commercial resins available from Shell Chemical Company, e.g., EKP 206 and EKP 207 (MW 6,000, epoxy equivalent weight 670). Other useful polyepoxides are the EPON™ Resins, derived from a liquid epoxy resin and bisphenol-A, available from Momentive, Inc., Columbus, Ohio. The epoxy resin is not limited to these, and these may be used singly or in a combination of two or more kinds. In a preferred embodiment the polyepoxy compound is trimethylolpropane triglycidyl ether (TTE).

Preferably b) the poly(amino acid)-polyol compound is present at 0.5 to 8.0 weight percent, 1.0 to 4.0 weight percent and 1.0 to 3.0 weight percent, in the thermoplastic melt-mixed composition.

By "reacting" means providing conditions such that one or more carboxylic acid functionality or amino functionality, reacts with one or more epoxy group of the polyepoxy compound to form an ester (C—O—C(O)—C) linkage and/or amino linkage (C—N—C) via ring-opening of the epoxy functionality. The ring-opening reaction also provides an equivalent of hydroxyl group for each polyester link and/or amino link formed. Herein, the reaction product is referred to as "poly(amino-acid)-polyol compound." The reacting may be accomplished by mixing and heating a combination of polyepoxy and amino acids to a reaction temperature for a reaction period to provide a desired percent conversion of the polyepoxy to poly(amino-acid)-polyol compound.

The percent epoxy conversion of the polyepoxy compound may be is determined by measuring the $^1$H NMR signal of one of the epoxy ring hydrogen diastereomers versus a second internal standard signal that does not change during the reaction. Thus, the reaction of selected polyepoxy and amino acids in the absence of polyamide resin can be used to empirically determine the propensity for a selected polyepoxy/amino acid composition to gel. Gelling, that is, cross-linking, is undesirable as the viscosity of the composition increases rapidly to the point where the composition may not be processible.

Suitable reaction temperatures include the range of 23° C. to 250° C. Suitable reaction periods include the range of 2 minutes to about 24 hours. As desired by the artisan, the reaction may be performed: under a range of pressure, for instance 2 atmospheres to about 0.01 mm Hg; in the presence or absence of a catalysis, e.g. acid catalysis or base catalysis; and in the presence or absence of a solvent; in the presence or absence of a plasticizer, or other additive that may be ultimately found desirable in the thermoplastic melt-mixed composition. In one embodiment the reaction is performed in the absence of a catalyst.

Reacting the combination of the polyepoxy compound (b2) and the amino acid b2) provides a poly(amino-acid)-polyol compound having a range of at least 10 percent conversion of epoxy equivalents of component (b1) up to, but excluding, the gel point of the components b1) and b2) as determined with $^1$H NMR analysis. In one embodiment the poly(amino-acid)-polyol compound has a $M_n$ of at least 200 to about 10000 as determined with size exclusion chromatography. In various embodiments the poly(amino-acid)-polyol compound has a $M_n$ of 400 to about 8000 and 800 to about 8000. In various embodiments the poly(amino-acid)-polyol compound has preferred ranges of at least 25 percent conversion, 40 percent conversion, 50 percent conversion, 80 percent conversion and 85 percent conversion, of epoxy groups in component b1) up to, but excluding, the gel point of the components b1) and b2).

Various embodiments include many combinations of polyepoxy compound b2) and amino acid b1) that provide a poly(amino-acid)-polyol compound that can be taken to 100% epoxy conversion without providing a gel point.

The upper limit of the extent of reaction of b2) polyepoxy compound and b1) amino acid to provide a useful reaction product is just below the gel point. The gel point is the point wherein the material is crosslinked and can no longer flow and be melt-blended to provide a uniform blend. The gel point can be calculated using a modified Carothers equation (G. Odian, Principles of Polymerization, 1981, ISBN 0-471-05146-2, John Wiley & Sons, Inc., p. 117-119) which is a statistical equation for nonequivalent (nonstoichiometric) reactant mixtures for 2 reagents, having at least 2 reactive groups A and B per molecule and at least one having more than 2 groups per molecule:

$$pc=1/\{r[1+(fA-2)][1+(fB-2)]\}\exp 1/2 \qquad \text{Eq. (I)}$$

where:
pc=conversion of group A at gel point, conversion of group B is r×pc
r=1 or <1, ratio of A to B groups
f>2 is a functionality of the reagent with functionality>2.

Examples of gel points (G-1-G-6), calculated using Eq (I) for various combinations of reagent functionality are listed in Table A.

TABLE A

| Gel point examples | G1 | G2 | G3 | G4 | G5 | G6 |
|---|---|---|---|---|---|---|
| Reagent A (polyepoxy) functionality (fA) | 4 | 4 | 6 | 6 | 4 | 6 |
| Reagent B (aminoacid) functionality (fB) | 2 | 2 | 2 | 2 | 4 | 6 |
| Molar ratio of A to B reagents | 0.5 | 0.25 | 0.33 | 0.083 | 1 | 0.5 |
| Molar (or equivalent) ratio of A to B groups (r) | 1 | 0.5 | 1 | 0.5 | 1 | 0.5 |
| Gel Point (pc for conversion of group A, from Eq. 1) | 0.577 | 0.816 | 0.447 | 0.894 | 0.333 | 0.283 |

In a preferred embodiment the ratio of b1) amino acid to b2) polyepoxy compound is such that the ratio of amine and carboxyl groups to epoxy group is in the range of 0.1 to 200, and more preferably 1.1 to 200 (excess amino acid). The ratio is determined by dividing the amount of each reagent used by the equivalent weight of the polyepoxy compound and the amino acid compound, respectively.

In a preferred embodiment the poly(amino-acid)-polyol compound b) has a $M_n$ of at least 200 to 10,000 or 400 to 10000, or 400 to 8000, as determined with size exclusion chromatography.

The thermoplastic melt-mixed composition comprises 10 to about 60 weight percent, and preferably 12.5 to 55, and 15 to 50 weight percent, of one or more reinforcement agents. The reinforcement agent may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof. In preferred embodiments the reinforcing agent is selected from the group consisting of glass fiber and glass fiber with noncircular cross-section. The glass fiber may have sizing or coupling agents, organic or inorganic materials that improve the bonding between glass and the polyamide resin.

Glass fibers with noncircular cross-section refer to glass fiber having a cross section having a major axis lying perpendicular to a longitudinal direction of the glass fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable glass fiber are disclosed in EP 0 190 001 and EP 0 196 194.

The thermoplastic melt-mixed composition, optionally, comprises 0 to 30 weight percent of a polymeric toughener comprising a reactive functional group and/or a metal salt of a carboxylic acid. In one embodiment the composition comprises 2 to 20 weight percent polymeric toughener selected from the group consisting of: a copolymer of ethylene, glycidyl (meth)acrylate, and optionally one or more (meth)acrylate esters; an ethylene/α-olefin or ethylene/α-olefin/diene is copolymer grafted with an unsaturated carboxylic anhydride; a copolymer of ethylene, 2-isocyanatoethyl (meth)acrylate, and optionally one or more (meth)acrylate esters; and a copolymer of ethylene and acrylic acid reacted with a Zn, Li, Mg or Mn compound to form the corresponding ionomer.

The thermoplastic composition of the present invention may also comprise 0 to 10 weight percent further additives commonly used in the art, such as further heat stabilizers or antioxidants referred to as "co-stabilizers", antistatic agents, blowing agents, plasticizers, lubricants and colorant and pigments. In one embodiment 0.02 to 0.5 weight percent of one or more lubricants is present. In another embodiment 0.1 to 3.0 weight percent of one or more colorants is present; wherein the weight percent colorant includes the weight of the carrier accompanying the colorant. In one embodiment the colorant is selected from the group of carbon black and nigrosine black pigment.

Co-stabilizers include copper stabilizers, secondary aryl amines, hindered amine light stabilizers (HALS), hindered phenols, and mixtures thereof, that are disclosed in US patent application publication 2010/0029819, Palmer et al, herein incorporated by reference.

All preferred embodiments disclosed above for the thermoplastic melt-mixed compositions are applicable to the processes and methods for preparing the thermoplastic melt-mixed compositions disclosed herein.

Another embodiment is a process for providing a thermoplastic melt-mixed composition comprising:
A) melt-blending:
  a) 15 to 89.5 weight percent of a polyamide resin;
  b) 0.5 to 10 weight percent of a poly(amino acid)-polyol compound provided by reacting:
    b1) 90 to 10 weight percent one or more amino acids selected from the group consisting of primary amino acids and secondary amino acids and combinations of these; said amino acid having no more than one hydroxyl group; and
    b2) 10 to 90 weight percent of one or more polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM D1652-11 method; and a number average molecular weight ($M_n$) of less than 8000;
  c) 10 to 60 weight percent of reinforcing agent;
  d) 0 to 30 weight percent polymeric toughener; and
  e) 0 to 10 weight percent further additives;
to provide said thermoplastic melt-mixed composition; wherein the weight percent of b) is based on the total weight of b1) and b2); said poly(amino acid)-polyol compound having a range of at least 10 percent conversion of epoxy equivalents of component b1) up to, but excluding, the gel point of the components b1) and b2) as determined with $^1$H NMR analysis of the poly(amino acid)-polyol compound In another embodiment the above disclosed process further comprises the step B) extruding strands of the thermoplastic melt-mixed composition and chopping the strands to provide pellets.

Herein the thermoplastic composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

In preferred embodiments the thermoplastic melt-mixed compositions disclosed above have a melt viscosity at a hold time of 25 minutes less than 600% and preferably less than 300, 200, and most preferably, less than 130%, of the melt viscosity at a hold time of 5 minutes; as measured at temperature 10° C. to 30° C. above the melting point of the polyamide resin, in a capillary reohmeter at a shear rate of 1000 sec$^{-1}$ according to ASTM D3835.

The melt-mixed compositions, as disclosed above, are useful in increasing long-term thermal stability at high temperatures of molded or extruded articles made therefrom. The long-term heat stability of the articles can be assessed by exposure (air oven ageing) of 2 mm thick test samples at various test temperatures in an oven for various test periods of time. The oven test temperatures for the compositions disclosed herein may be 170° C. and 500, 1000, or 2000 hours test periods; 210° C. and 500 or 1000 hours test periods; and 230° C. and 500 or 1000 hours test periods. The test samples, after air oven ageing, are tested for tensile strength and elongation to break, according to ISO 527-2/1BA test method; and compared with unexposed controls having identical composition and shape, that are dry as molded (DAM). The comparison with the DAM controls provides the retention of tensile strength and/or retention of elongation to break, and thus the various compositions can be assessed as to long-term heat stability performance.

Another embodiment is a method for improving tensile strength retention of a thermoplastic melt-mixed composition under air oven ageing (AOA) conditions comprising:

melt-blending:
a) 15 to 89.5 weight percent of a polyamide resin;
b) 0.5 to 10 weight percent of a poly(amino acid)-polyol compound provided by reacting:
  b1) 90 to 10 weight percent one or more amino acids selected from the group consisting of primary amino acids and secondary amino acids and combinations of these; said amino acid having no more than one hydroxyl group; and
  b2) 10 to 90 weight percent of one or more polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM 01652-11 method; and a number average molecular weight ($M_n$) of less than 8000;
c) 10 to 60 weight percent of reinforcing agent;
d) 0 to 30 weight percent polymeric toughener; and
e) 0 to 10 weight percent further additives;
to provide said thermoplastic melt-mixed composition; wherein the weight percent of b) is based on the total weight of b1) and b2); said poly(amino acid)-polyol compound having a range of at least 10 percent conversion of epoxy equivalents of component (a) up to, but excluding, the gel point of the components a) and b) as determined with $^1$H NMR analysis of the poly(amino acid)-polyol compound; wherein 2 mm thick test bars, prepared from said melt-mixed composition and tested according to ISO 527-2/1BA, and exposed at a test temperature of 230° C. for a test period of 1000 hours, in an atmosphere of air, have on average, a retention of tensile strength of at least 25 percent, as compared with that of an unexposed control of identical composition and shape; and wherein the polyamide resin comprises a one or more polyamides selected from the group consisting of Group (IIB) Polyamides, Group (III) Polyamides, Group (IV) Polyamides, Group (V) Polyamides, as defined herein One embodiment is a molded or extruded thermoplastic article comprising the thermoplastic melt-mixed composition as disclosed in the above, wherein the polyamide resin comprises one or more Group (I) Polyamides, wherein 2 mm thick test bars, prepared from said melt-mixed composition and tested according to ISO 527-2/1BA, and exposed at a test temperature of 170° C. for a test period of 500 hours, in an atmosphere of air, have on average, a retention of tensile strength of at least 40 percent, and preferably at least 50, 60, 70, 80, and 90%, as compared with that of an unexposed control of identical composition and shape.

One embodiment is a molded or extruded thermoplastic article comprising the thermoplastic melt-mixed composition, as disclosed in the above embodiments, wherein the polyamide resin comprises one or more Group (II) Polyamides, wherein 2 mm thick test bars, prepared from said melt-mixed composition and tested according to ISO 527-2/1BA, and exposed at a test temperature of 210° C. for a test period of 500 hours, in an atmosphere of air, have on average, a retention of tensile strength of at least 40 percent, and preferably at least 50, 60, 70, 80, and 90%, as compared with that of an unexposed control of identical composition and shape.

One embodiment is a molded or extruded thermoplastic article comprising the thermoplastic melt-mixed composition, as disclosed in the above embodiments, wherein the polyamide resin comprises a one or more polyamides selected from the group consisting of Group (IIB) Polyamides, Group (III) Polyamides, Group (IV) Polyamides, Group (V) Polyamides, and Group (VI) Polyamides, wherein 2 mm thick test bars, prepared from said melt-mixed composition and tested according to ISO 527-2/1BA, and exposed at a test temperature of 230° C. for a test period of 1000 hours, in an atmosphere of air, have on average, a retention of tensile strength of at least 25 percent, and preferably at least 40, 50, 60, 70, 80, and 90%, as compared with that of an unexposed control of identical composition and shape.

In another aspect, the present invention relates to a method for manufacturing an article by shaping the thermoplastic polyamide composition disclosed herein. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants; and noise reduction allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. As an illustrative example of desired mechanical resistance against long-term high temperature exposure, a charge air cooler can be mentioned. A charge air cooler is a part of the radiator of a vehicle that improves engine combustion efficiency. Charge air coolers reduce the charge air temperature and increase the density of the air after compression in the turbocharger thus allowing more air to enter into the cylinders to improve engine efficiency. Since the temperature of the incoming air can be more than 200° C. when it enters the charge air cooler, it is required that this part be made out of a composition maintaining good mechanical properties under high temperatures for an extended period of time. Also it is very desirable to have a shaped article that exhibits no whitening or very little whitening upon aging.

The present invention is further illustrated by the following examples. It should be understood that the following examples are for illustration purposes only, and are not used to limit the present invention thereto.

Methods

Compounding Methods

All Examples and Comparative Examples were prepared by melt blending the ingredients listed in the Table in a 30 mm twin screw extruder (ZSK 30 by Coperion) operating at about 280° C. for PA66 compositions, using a screw speed of about 300-400 rpm, a throughput of 30-40 lb/h (13.6-18.1 kg/h) and a melt temperature measured by hand of about 320-355° C. for all compositions. The glass fibers were added to the melt through a screw side feeder. All other ingredients were added at the beginning of the extruder except as noted in Methods 1. Ingredient quantities shown in the Table are given in weight percent on the basis of the total weight of the thermoplastic composition.

Method 1—A fraction (e.g. 500 g) of the polyamide was subjected to cryogenic grinding in a Bantam Micropulverizer to provide about 1 millimeter average particle size particles. The poly(amino acid)-polyol was blended into the ground particles to provide a uniform blend that was added via a powder feeder to the beginning of the extruder.

The compounded mixture was extruded in the form of laces or strands, cooled in a water bath, chopped into granules.

Mechanical Tensile Properties

Mechanical tensile properties, i.e. E-modulus, stress at break (Tensile strength) and strain at break (elongation at break) were measured according to ISO 527-2/1BA. Measurements were made on 2 mm thick injection molded ISO tensile is bars at a testing speed of 5 mm/min. Mold temperature for PA 66 test specimens was 80° C.

Air Oven Ageing (AOA)

The test specimens were heat aged in a re-circulating air ovens (Heraeus type UT6060) according to the procedure detailed in ISO 2578. At various heat aging times, the test specimens were removed from the oven, allowed to cool to room temperature and sealed into aluminum lined bags until ready for testing. The tensile mechanical properties were then measured according to ISO 527 using a Zwick tensile instrument. The average values obtained from 5 specimens are given in the Tables.

Melt Viscosity

Melt viscosity retention was determined at a hold time of 25 minutes as compared to the melt viscosity at a hold time of 5 minutes; as measured at temperature 10° C. to 30° C. above the melting point of the polyamide resin, in a capillary reohmeter (Kayness) at a shear rate of 1000 sec$^{-1}$ according to ASTM D3835.

$^1$H NMR Method for Epoxy Conversion

The 1H spectra are recorded in CDCl$_3$ on Bruker 500 MHz NMR Spectrometer operating at 500 MHz. The percent conversion of the epoxy functionality in the polyepoxy compound is determined by measuring the $^1$H NMR signal of one of the epoxy ring hydrogen diastereomers versus a second internal standard signal that does not change during the reaction with polyhydroxy compound. The ratio of the epoxy ring hydrogen signal to the standard signal, adjusted for the moles of epoxy functionality and standard in the starting composition, and number of hydrogens in the standard signal, is used to determine the % conversion. For instance, with trimethylolpropane triglycidyl ether (TTE), the methyl group of the TTE is chosen as the internal standard signal (0.80 ppm) and one of the epoxy hydrogen diastereomers (2.55 ppm) is the epoxy signal measured. The following calculation provides the % conversion:

Epoxy Conversion (%) =
$$100 - \frac{\text{Area peak at 2.55 } ppm \text{ (broad } \underline{CH2}, \text{ } TTE \text{ epoxy ring)}}{\text{Area peak at 0.80 } ppm \text{ (broad } \underline{CH3}CH2-, \text{ } TTE)} \times 100$$

In this case no adjustment of the ratio is needed as there are three equivalent epoxy groups each having one equivalent diastereomer hydrogen and three equivalent methyl hydrogens in the internal standard.

Whitening Determination Method

Two 5 in×3 in×3 mm plaques were treated by placing in an environmental chamber under conditions of 85% relative humidity and 85° C. After one day one plaque was removed from the chamber and visually inspected. The L value, determined at 110° reflection was measured with a ChromaVision MA100 Multi-Angle Spectrophotometer (manufactured by X-Rite, Incorporated, Grandville, Mich.). L is a common measure of whiteness on the CIELAB colorspace. The L value was measured at 4 places on the plaque, both front and back and the L values averaged. A determination of L also was performed on an untreated plaque. A ΔL value was determined by subtracting the average of the four L measurements of the untreated plaque from the average of the four measurements from the treated plaque. After 7 days, the second plaque was removed from the chamber and the L value and ΔL value determined.

Low L values correspond to darker plaques and higher L values correspond to lighter plaques. Therefore a positive ΔL means a change from darker to lighter.

A survey found that, by visual observation, those of ordinary skill in the art could identify three levels of whitening, listed in Table B, corresponding to the ΔL values determined by spectroscopic measurements means. Thus, using this relationship in some examples, visual observation was used to evaluate whitening where the L values could not be conveniently measured.

TABLE B

| Characterization of Whitening | |
|---|---|
| Visual observation | ΔL (110°) |
| none | ΔL < 5 |
| slight | 5 < ΔL < 15 |
| moderate | 15 < ΔL < 25 |
| severe | ΔL > 25 |

Materials

PA66 refers to an aliphatic polyamide made of 1,6-hexanedioic acid and 1,6-hexamethylenediamine having a typical relative viscosity of 49 and a melting point of about 263° C., commercially available from E.I. DuPont de Nemours and Company, Wilmington, Del., USA under the trademark Zytel® 101NC010 polyamide.

Glass fibers A refer NEG D187H glass fibers manufactured by Nippon Electric Glass, Osaka, Japan.

Black Pigment A refers to ZYTEL® FE3786 BK031C black concentrate, a 40 wt % nigrosine black pigment concentrate in a PA66 carrier.

Black Pigment B refers ZYTEL® FE3779 BK031C black concentrate, a 25 wt % carbon black in a PA6 carrier.

Cu heat stabilizer refers to a mixture of 7 parts of potassium iodide and 1 part of copper iodide in 0.5 part of aluminum stearate wax binder.

Kemamide E180 lubricant is N-stearylerucamide, CAS No. [10094-45-8], available from Chemtura Corp., Philadelphia, Pa.

TTE refers to trimethylolpropane triglycidyl ether from Sigma-Aldrich.

L-lysine was available from Aldrich Chemical Co.

LT31 (3 lysine+1 trimethyolpropanetriglycidyl ether) poly(amino acid)-polyol: L-lysine (146 equivalent weight, 200 g, 1.368 mol) and ethylene glycol (500 g) were combined in a reaction flask and heated to 60° C. for 1.5 h under an atmosphere of nitrogen, until the L-lysine dissolved. TTE (302 equivalent weight, 138 g, 0.456 mol) was added drop wise (~1-2 drops/sec) over 30 minutes to a stirred vortex of the L-lysine/ethylene glycol mixture. The mixture was stirred about 18 h at 60° C., cooled to room temperature, and methanol (300 mL) added to provide a solution. The solution was slowly added to 1.75 L of rapidly stirred tetrahydrofuran (THF) to precipitate the poly(amino acid)-polyol. The supernatant was decanted and the precipitate treated again with methanol and THF to provide a purified solid precipitate that was collected and dried in vacuum at 80° C. Yield was 99%. The number average molecular weight was 5381 (as determined with size exclusion chromatography based on PMMA standard) and polydispersity was 2.8.

EXAMPLES

TABLE 1

|  | Example | |
| --- | --- | --- |
|  | C-1 | 1 |
| PA66 | 63.00 | 59.90 |
| Glass Fiber A | 35.00 | 35.00 |
| Cu heat stabilizer | 0.30 | 0.40 |
| Black Pigment A | 0.60 | 0.60 |
| Black Pigment B | 1.00 | 1.00 |
| Kemamide E180 | 0.10 | 0.10 |
| LT31 (3 lysine + 1 trimethyolpropanetriglycidyl ether) |  | 3.00 |
| Tensile Properties, Dry-As-Molded | | |
| Tensile Strength [MPa] | 235 | 246 |
| Elongation [%] | 5.0 | 4.9 |
| Tensile Properties, 500 h at 230° C. | | |
| Tensile Strength [MPa] | 70 | 215 |
| Tensile Strength Retention [%] | 30% | 87% |
| Elongation [%] | 1.9 | 3.3 |
| Elongation Retention [%] | 37% | 68% |
| Tensile Properties, 1000 h at 230° C. | | |
| Tensile Strength [MPa] | 3 | 153 |
| Tensile Strength Retention [%] | 1% | 62% |
| Elongation [%] | 0.3 | 3.0 |
| Elongation Retention [%] | 6% | 61% |
| Melt Viscosity @ 290° C. | | |
| MV @ 5 min | 278 | 91.0 |
| MV @ 25 min | 210 | 14.0 |
| % MV Retention | 76% | 15% |

We claim:
1. A thermoplastic melt-mixed composition comprising:
   a) 15 to 89.5 weight percent of a poly(hexamethylene hexanediamide);
   b) 0.5 to 10 weight percent of a poly(amino acid)-polyol compound provided by reacting:
      b1) 90 to 10 weight percent of one or more amino acids selected from the group consisting of primary amino acids and secondary amino acids and combinations of these; said amino acid having no more than one hydroxyl group;
      b2) 10 to 90 weight percent of one or more polyepoxy compounds comprising at least two or more epoxy groups; the polyepoxy compounds having an epoxide equivalent weight of 43 to 4000 g/equivalent as determined by calculation, or if one or more of the polyepoxy compounds is an oligomer, by titration using ASTM D1652-11 method; and a number average molecular weight (Mn) of less than 8000;
   wherein the weight percent of component b) is based on the total weight of b1) and b2); said poly(amino acid)-polyol compound having a range of at least 10 percent conversion of epoxy equivalents of component (b1) up to, but excluding, the gel point of the components b1) and b2) as determined with $^1$H NMR analysis of the poly(amino acid)-polyol;
   c) 10 to 60 weight percent of reinforcing agent;
   d) 0 to 30 weight percent polymeric toughener; and
   e) 0 to 10 weight percent further additives;
   wherein the weight percentages a), b), c), d), and e) are based on the total weight of the thermoplastic melt-mixed composition.
2. The thermoplastic melt-mixed composition of claim 1 wherein the one or more amino acids have a number average molecular weight of up to 500.
3. The thermoplastic melt-mixed composition of claim 1 wherein the poly(amino acid)-polyol compound has a number average molecular weight of about 200 to about 10000.
4. The thermoplastic melt-mixed composition of claim 1 wherein said poly(amino acid)-polyol compound has at least 25 percent conversion of epoxy equivalents.
5. The thermoplastic melt-mixed composition of claim 1 wherein the amino acid is selected from the group consisting of 6-aminohexanoic acid, lysine, 11-aminoundecanoic acid, 4-aminobenzoic acid; and salts of these compounds.
6. The thermoplastic melt-mixed composition of claim 1 wherein the polyepoxy compound is trimethylolpropane triglycidyl ether.
7. A molded or extruded article made from the thermoplastic melt-mixed composition of claim 1.
8. The molded or extruded thermoplastic article of claim 7 wherein 2 mm thick is test bars, prepared from said melt-mixed composition and tested according to ISO 527-2/1BA, and exposed at a test temperature of 230° C. for a test period of 500 hours, in an atmosphere of air, have on average, a retention of tensile strength of at least 25 percent, as compared with that of an unexposed control of identical composition and shape.
9. A process for providing a thermoplastic melt-mixed composition comprising:
   A) melt-blending:
      a) 15 to 89.5 weight percent of poly(hexamethylene hexanediamide);
      b) 0.5 to 10 weight percent of a poly(amino acid)-polyol compound provided by reacting:
         b1) 90 to 10 weight percent of one or more amino acids selected from the group consisting of primary amino acids and secondary amino acids and combinations of these; said amino acid having no more than one hydroxyl group; and b2) 10 to 90 weight percent of a polyepoxy compound comprising at least two or more epoxy groups; the polyepoxy compound having a epoxide equivalent weight of 43 to 4000 g/equivalent as determined by calculation, or if the polyepoxy compound is an oligomer, by titration using ASTM D1652-11 method; and a number average molecular weight ($M_n$) of less than 8000;

c) 10 to 60 weight percent of reinforcing agent;
d) 0 to 30 weight percent polymeric toughener; and
e) 0 to 10 weight percent further additives;

to provide said thermoplastic melt-mixed composition; wherein the weight percent of b) is based on the total weight of b1) and b2); said poly(amino acid)-polyol compound having a range of at least 10 percent conversion of epoxy equivalents of component b1) up to, but excluding, the gel point of the components b1) and b2) as determined with $^1$H NMR analysis of the poly(amino acid)-polyol compound.

* * * * *